Sept. 4, 1934.　　　　H. F. HOBBS　　　　1,972,484
TRANSMISSION MECHANISM
Original Filed Sept. 22, 1930　　2 Sheets-Sheet 1
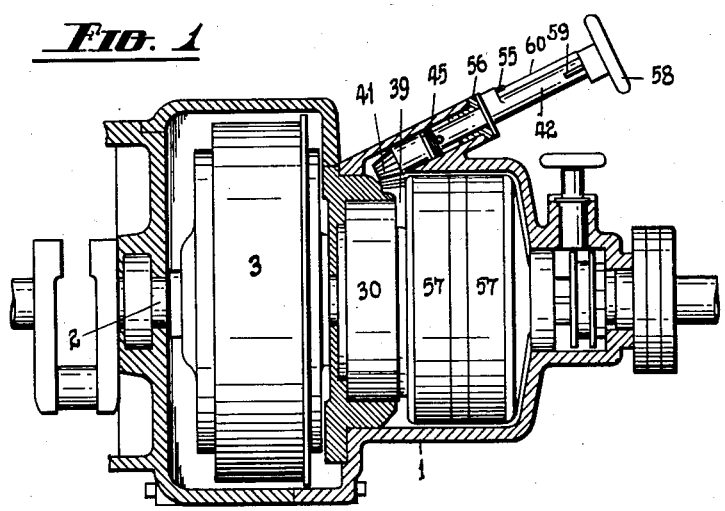
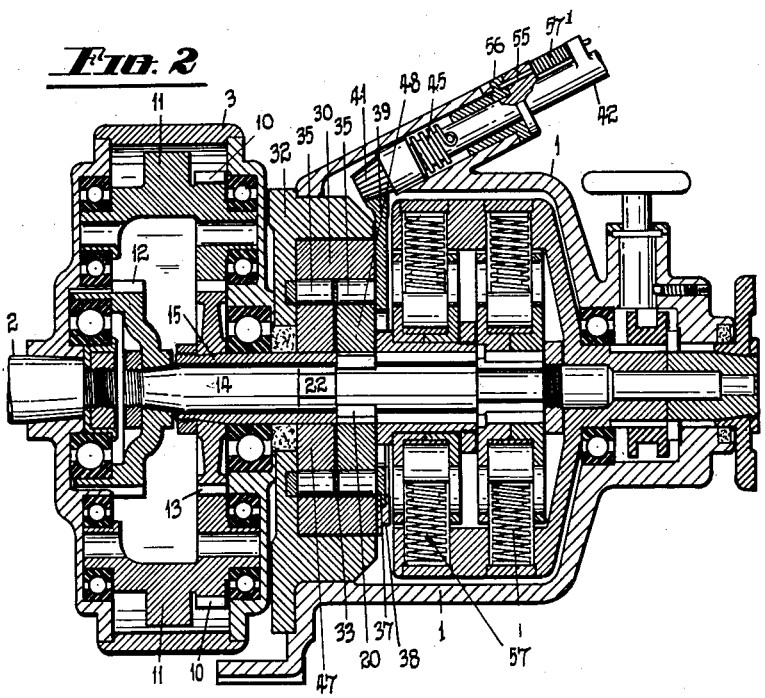
INVENTOR
H. F. Hobbs
BY
ATTORNEYS Sept. 4, 1934.  H. F. HOBBS  1,972,484
TRANSMISSION MECHANISM
Original Filed Sept. 22, 1930  2 Sheets-Sheet 2
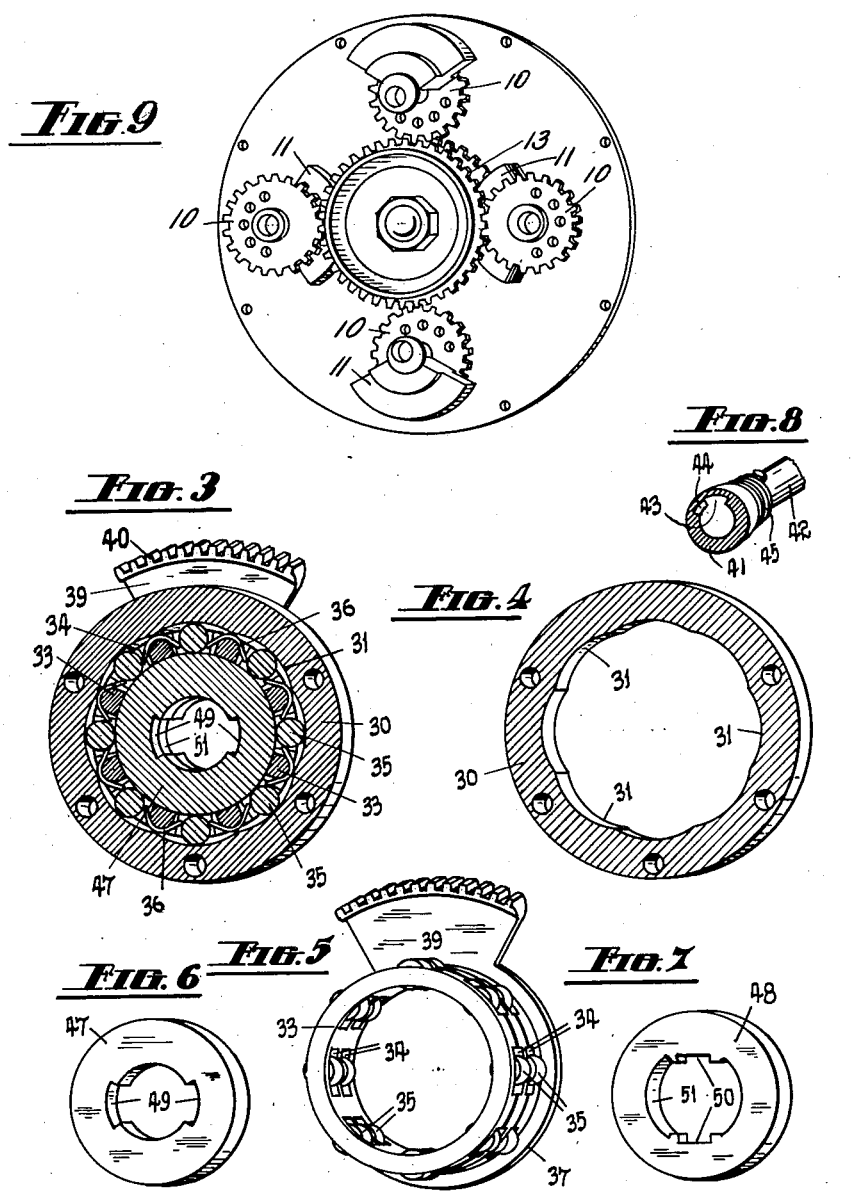
INVENTOR
H. F. Hobbs
BY
ATTORNEYS Patented Sept. 4, 1934

1,972,484

UNITED STATES PATENT OFFICE 1,972,484

TRANSMISSION MECHANISM

Howard Frederick Hobbs, Paradise, South Australia, Australia

Original application September 22, 1930, Serial No. 483,656. Divided and this application July 13, 1931, Serial No. 550,584. In Australia April 4, 1930

4 Claims. (Cl. 188—81)

The application is a divisional application of my application Serial Number 483,656 filed 22nd September 1930, now Patent No. 1,865,910 issued July 5, 1932.

The purpose of this invention is to provide an improved ratchet gear particularly for use in automatically variable transmission gears and it comprises an outer fixed member, an inner rotating member or members and a roller cage, together with means for setting the roller cage comprising teeth upon an extension of the cage, a pinion to engage such teeth, the pinion being loosely coupled on a control shaft a hand wheel to operate such control shaft and means for locking such control shaft in position.

In order that my invention may be the more clearly understood I will describe the same with reference to the accompanying drawings in which:—

Fig. 1 is a side elevation of a double acting automatically variable transmission gear incorporating such a ratchet gear.

Fig. 2 is a central vertical section of the gear.

Fig. 3 is a cross sectional perspective view of the ratchet gear.

Fig. 4 is a similar cross section view showing only the fixed or outer member of the ratchet gear.

Fig. 5 is a perspective view of the roller cage of the ratchet gear.

Figs. 6 and 7 are perspective views of the rotating or inner members of the ratchet gear.

Fig. 8 is a cross sectional perspective view showing especially the connection between the hand wheel and pinion of the cage adjustment and holding device.

Fig. 9 is a perspective view of the two pairs of weights and their driving connections used in the gears shown in Fig. 2, the front plate of the frame or casing being omitted.

The automatically variable gear shown in Figs. 1 and 2 comprises a frame or casing 3 upon a driver shaft 2 in which frame or casing are rotatably supported two sets of eccentric weights 11 which are connected to two intermediate shafts 14 and 15 by pinions 10 upon the weights and gear wheels 12 and 13 upon the intermediate shafts. When the driver shaft 2 is rotated the frame 3 rotates therewith carrying the weights 11 with it. The weights 11 are caused to rotate by reason of their geared engagement with the gear wheels 12, 13. During the inward movement of the weights the centrifugal force thereon acting through the pinions 10 will rotate the gear wheels 12, 13, in one direction and during the outward movement of the weights the centrifugal force thereon also acting through the pinions 10 will rotate the gear wheels in the opposite direction. The alternating forces thus imposed on the gear wheels 12, 13, tend to cause an oscillatory motion of the gear wheels. The action of the weights is more fully described in the specification of my Patent No. 1,865,910.

It is the purpose of the ratchet gear to prevent any rotation of the intermediate shafts in a direction opposite to that required, the direction being changeable at will by setting the cage as will be described later.

The intermediate shafts 14 and 15 have pairs of projecting lugs 20 and 22 respectively upon them upon which the inner rotating members of the ratchet gear are secured. It is to be understood however that the construction described is a convenient form but I do not limit myself thereto.

The ratchet gear comprises an outer fixed member a roller cage and two inner rotating members. The outer member consists of a circular ring 30 concentric with the intermediate shafts 14 and 15 having in its inner face a number of curves 31 of a radius somewhat smaller than the radius of the inside of the ring. The ring as shown in the drawings may be secured to a block 32 and this then secured to the housing 1 of the gear but the ring may be attached to any other convenient stationary part.

The roller cage consists of a cage 33 having two rows of holes 34 through it, the holes in each row being adjacent the curves 31 in the outer fixed member 30. Within each of the holes is a roller 35 of diameter slightly greater than the thickness of the cage. The holes 34 are sufficiently long to allow the rollers 35 a small amount of radial movement, but springs 36 are provided to normally hold such rollers in the central position in the holes 34. The cage 33 is provided with means for holding it in position comprising a flange 37 upon its back which contacts on the one side with the outer member 30 and on the other side with a guard 38 attached to the outer member, the flange 37 having an upwardly projecting portion 39 which has a number of teeth 40 upon its top which are engaged by a small pinion 41 on a control shaft 42.

The pinion 41 is loose on the shaft 42 but has within it a slot 43 which fits over a key 44 upon the shaft. The slot is of greater width than the key, and the pinion 41 can thus rock upon the shaft 42 but it is normally held in its one position by a spring 45 which has its one end connected to the pinion 41 and its other end connected to the shaft 42. This gives a slight flexibility and allows the cage 33 to adapt itself to its best working position.

The shaft 42 may be locked in position by a dog 55 engaging holes in the housing 1 or in a member 56 as shown in the drawings, which member is attached to the housing 1. The dog 55 is slidably held to the control shaft 42 and is held in engaged position by a spring 57'. A hand wheel 58 upon the end of the control shaft is made slidable on such shaft but is kept from rotating thereon by splines 59. The dog 55 is connected to the hand wheel 58 by a rod 60 and is withdrawn from the holes by pulling the hand wheel 58 upwards.

The two inner rotating members 47 and 48 fit neatly within the cage 33 and the rollers 35 contact with the outer faces of the members 47 and 48. The one inner rotating member 47 is attached to the outer intermediate shaft 15 the slots 49 on the member engaging the lugs 22 upon that shaft and locking the member thereto. The other inner rotating member 48 is attached to the inner intermediate shaft 14 the slots 50 in that member engaging the lugs 20 upon that shaft. The cut-away portions 51 are for assembly and also to clear the lugs 22 upon the outer intermediate shaft when working so as to allow a radial movement between the two intermediate shafts.

In operation by setting the cage 33 slightly to one side the rollers 35 are brought nearer to that end of the curved faces 31 of the outer member 30 while the cage 33 prevents them moving towards their other ends, and should the intermediate shafts 14 and 15 be rotated in the direction of the set of the cage the rollers 35 will immediately wedge between the outer member 30 and the inner members 47 and 48 and hold the intermediate shafts firmly to the housing 1 of the gear but leave it free to rotate in the opposite direction as the rollers 35 will strike the ends of the holes 34 in the cage 33 preventing them from passing towards that end of the curved faces 31 of the outer member 30 and so wedging.

By setting the cage in the opposite direction the intermediate shafts 14 and 15 are held against rotation in that direction.

By setting the cage to its central position the intermediate shafts 14 and 15 are free to rotate in either direction.

Just behind the ratchet gear are shown the flexible couplings 57 which link the intermediate shafts 14 and 15 to the driven shaft.

It is to be clearly understood that in place of two inner rotating members and two sets of rollers as shown one such inner member and one set of rollers or three or more inner members and three or more sets of rollers may be used. More than one set of rollers may be used to each inner rotating member.

What I claim is:—

1. In an automatically variable transmission gear of the planetary weight type, a ratchet device to check any rotation in a direction opposite to that required of a part receiving oscillatory forces from the planetary weights, comprising an inner member, an outer member surrounding the inner member, at least one of said members having jamming surfaces and one of said members being carried by said part, rollers between and cooperating with the inner and outer members, a nonrotatable cage carrying the rollers and serving to maintain the rollers in the desired positions, springs to press the rollers towards the jamming surfaces, and means permitting slight free rotary motion of the cage to permit the rollers to adapt themselves automatically to the best working conditions.

2. In an automatically variable transmission gear of the planetary weight type, a ratchet device to check any rotation in a direction opposite to that required of a part receiving oscillatory forces from the planetary weights, comprising an inner member, an outer member surrounding the inner member, at least one of said members having jamming surfaces and one of said members being carried by said part, rollers between and cooperating with the inner and outer members, a nonrotatable cage carrying the rollers and serving to maintain the rollers in the desired positions, springs to press the rollers towards the jamming surfaces, a toothed extension on said cage, a pinion engaging the toothed extension, a control shaft carrying said pinion, and means permitting slight free rotary movements of the pinion in relation to the control shaft, the arrangement being such that rotation of the control shaft causes the pinion to adjust the cage for forward or reverse drive and the cage is at all times free to move slightly to enable the rollers to adapt themselves to the best working conditions.

3. A ratchet device as in claim 2, having a key and slot connection between the pinion and control shaft, the slot being larger than the key to permit the slight rotary movements of the cage, and a spring connected at one end to the pinion and at its other end to the control shaft to prevent the slight rotary movements from being undesirably slack.

4. A ratchet gear as set forth in claim 2, wherein the control shaft is provided with a handwheel whereby it may be rotated and with a slidable pin adapted to engage holes in a member secured to the housing of the gear whereby it may be locked, the slidable pin being connected to the handwheel so that it may be withdrawn thereby from said holes.

HOWARD FREDERICK HOBBS.